United States Patent [19]

Lo

[11] Patent Number: 5,293,712

[45] Date of Patent: Mar. 15, 1994

[54] REMOTE CONTROL FISHING TACKLE

[76] Inventor: Chung-Pao Lo, 4/F, No. 118-1, SEC. 1, Chung-Shan N. Rd., Taipei, Taiwan

[21] Appl. No.: 962,713

[22] Filed: Oct. 19, 1992

[51] Int. Cl.$^5$ .............................................. A01K 89/00
[52] U.S. Cl. ..................... 43/26.1; 446/456; 446/163
[58] Field of Search ............ 446/165, 164, 163, 456; 43/26.1, 4, 27.4

[56] References Cited

U.S. PATENT DOCUMENTS

| | | | |
|---|---|---|---|
| 3,046,697 | 7/1962 | Pullen | 446/164 |
| 3,793,761 | 2/1974 | Bonham | 43/26.1 |
| 4,237,642 | 12/1980 | Petorella | 43/26.1 |
| 4,339,888 | 7/1982 | Sheng-Jung | 43/26.1 |
| 5,086,581 | 2/1992 | Barra | 43/26.1 |
| 5,135,427 | 8/1992 | Suto et al. | 446/456 |
| 5,165,193 | 11/1992 | Dankwardt | 43/26.1 |

FOREIGN PATENT DOCUMENTS

| | | | |
|---|---|---|---|
| 2612047 | 9/1988 | France | 43/4 |
| 1600823 | 10/1990 | U.S.S.R. | 446/163 |

Primary Examiner—Kurt C. Rowan
Assistant Examiner—James Miner
Attorney, Agent, or Firm—Jacobson, Price, Holman & Stern

[57] ABSTRACT

A remote control fishing tackle having a main controller (10) and a separate float unit (30) for operating remotely from the main controller and connected thereto by a primary fishing line (351). A secondary fishing line (352) is suspended from the float unit and has a fish hook (353) thereon. The main controller has a radio transmitter (21) with an electric power source (23) and a reel (22) for the fishing line for unreeling and reeling in the float unit. The float unit has a receiver (31), batteries (60), two electric motor units (40, 41) driving separate propellers (44, 45) in two water channels (50, 51), or a common water channel (70), and electronic speed controllers (30, 33) operated by the receiver in response to signals from the transmitter controlled by separate control elements (11, 12) so that the float unit can be propelled forward and backward and turned. The reel is operated selectively by a power drive or manually (15).

8 Claims, 7 Drawing Sheets

REMOTE CONTROL FISHING TACKLE

BACKGROUND OF THE INVENTION

The conventional fishing tackle consists of a fishing rod as well as a reeling device fastened with a fishing line having a float, a sinker, a hook and a bait (or lure) on it.

In general, when fishing, the fisherman manually casts the fishing hook away from the shore and then proceeds fishing.

Since the distance of manual casting is limited, it is difficult to achieve the goal of catching fish effectively. In addition, the effects of bad weather patterns and terrible bank conditions usually make the fisherman unsatisfied with their fishing activities so that the fishing sport can never become a popular leisure activity.

SUMMARY OF THE INVENTION

It is the principal object of the present invention to provide a complete set of remote control fishing equipment which consists of a main controller and a controlled unit operated by the main controller that can be operated effectively and conveniently.

It is another object of the present invention to provide a remote control fishing tackle which the fisherman can easily operate to reach a desired fishing spot remote from the shore for fishing.

In view of the above, the purpose of the present invention is to offer a remote control fishing tackle with which the fisherman can easily operate to reach a wanted fishing spot far away from the shore. A main controlling unit and a controlled float unit constitute the remote control fishing tackle. The main controller which is manipulated by the user contains a transmitter, a battery set, and a reeling device (including a motor-activated mechanism and a manual reeling mechanism). A transmitting antenna, an fishing line holder, a on-off switch, two throttle sticks and a reel-handle are also provided on the outside of the main controlling unit.

The flying-saucer-shape (or oval or any other similar shape) controlled unit acts as a moving float and a carrier of a fishing hook as well as bait (or lure).

It consists of a radio wave receiver with a receiving antenna, two electronic speed controllers (or a single PC board) and a battery set. There also are two parallel tubes in the lower part of the controlled unit used as twin-propelling-water-channels in each of which is mounted a motor-activated propeller.

The above two parallel tubes can also be designed as a whole driving water channel protected by a mesh cover below the two propellers in order to avoid disturbance from external objects.

The main controller takes the place of the conventional fishing rod. The user simply holds the controller and operates two throttle sticks up and down by fingers to control the twin propellers via bifrequency radio wave signals to drive the controlled unit to the designated fishing spot instead of casting the fishing hook manually.

When pushing the two control sticks on the main controller upward at the same time, the twin propellers are functioning forward and the controlled unit will be moving ahead. When pushing the two sticks downward simultaneously, the controlled unit is moving backwards. If the right stick only is pressed upwardly (left stick is in neutral position) the controlled unit will turn left, and vice-versa. If the right stick is pressed upwardly and the left stick is pressed downwardly at the same time, the controlled unit will revolve around counterclockwise, while moving the sticks the other way causes the controlled unit to revolve around clockwise.

In other words, each throttle stick wireless-controls the counter part of the twin propellers through the transmitter and receiver and, in turn, drives the controlled unit either to and fro or to turn right or left in order to carry the fish hook and bait to the designated fishing spot in the remote area where the fish more likely gather around.

In this case, a rudder is redundant so that it was excluded from the present invention to prevent tangling with fishing lines and damage from marine objects.

The combination of the powered and manual reeling devices makes the present invention convenient and comfortable. The user can either press the button switch or rotate the reel-handle both of which are provided outside the main controlling unit to retrieve the controlled unit and the prey.

Furthermore, the above-mentioned twin propelling water channels in the lower half of the controlled unit are not necessarily in tubular shape. They can be not only divided into two regular or irregular covered water channels parallel to each other but also designed as an integral driving water channel under the solid controlled unit covered by a mesh as long as the controlled unit can function properly according to the user's instruction.

Over all, the main purpose of the present invention is to offer a complete set of remote control fishing equipment which consists of a main controller and a controlled unit that can be operated easily and comfortably.

In use, after tying up the fish hook and bait onto the secondary (kid) fishing line which is fastened to the fishing line holder at the rear of the controlled unit, the user simply holds the main controller with both hands instead of casting the hook and bait away then operates the two throttle sticks via transmitter and receiver to drive the controlled unit which is fastened with a primary (parent) fishing line extended from the reel in the main controlling unit to get to the ideal fishing spot for static fishing.

In addition, the user can also put a lure on the hook and keep the controlled unit going back and forth for dynamic fishing.

Finally, when the fish is being caught, the user can optionally select to take the controlled unit together with the prey back to the bank either by powered reeling or by manual reeling.

Featured remote control main controller with auto and manual reeling device as well as flying-saucer-shape controlled unit with well-covered twin parallel propellers, the present invention has the following advantages:

1. Able to place the fish hook at the ideal spot
2. Free of casting
3. Broad range of fishing area—greater chance to catch fish
4. Large contact with water—not likely to turn upside down
5. Quickness of turning around
6. Easy to carry
7. Omission of rudder—prevent from entangling with fishing lines 8. Propellers are well protected—avoid disturbing by external objects
9. Powered reeling
10. Unaffected by wind, tide and trees

BRIEF DESCRIPTION OF THE DRAWINGS

Other objects and features of the present invention will become apparent from a consideration of the following description with reference to the accompanying drawings showing certain selected exemplary embodiments to illustrate the invention and wherein.

DETAILED DESCRIPTION

Figure 1:
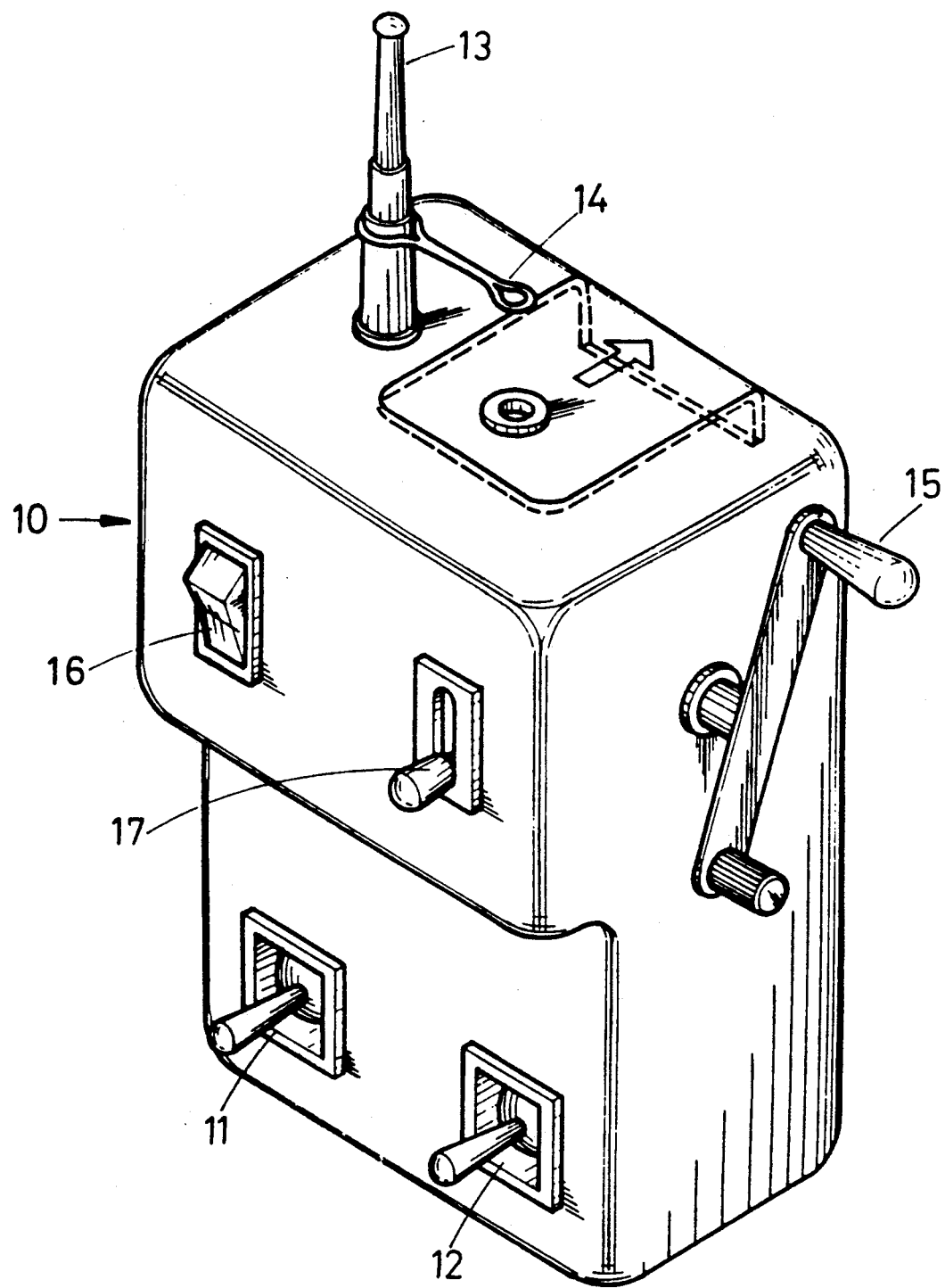
FIG. 1 is a perspective view of main controller of the present invention.

The present invention can be fully explained in detail in accordance with a first embodiment therewith with reference to the accompanying FIGS. 1-7.

A remote control fishing tackle according to the present invention consists of a main controller 10 and a controlled float unit 30. Two throttle sticks 11, 12, a transmitting antenna 13, a fishing line ring 14, a reel-handle 15, a powered reeling switch 16 and a clutch stick 17 are provided outside the main controller 10, and a radio wave transmitter 21, a reeling device 22 and a battery set 23 are disposed inside the main controller 10.

Figure 2:
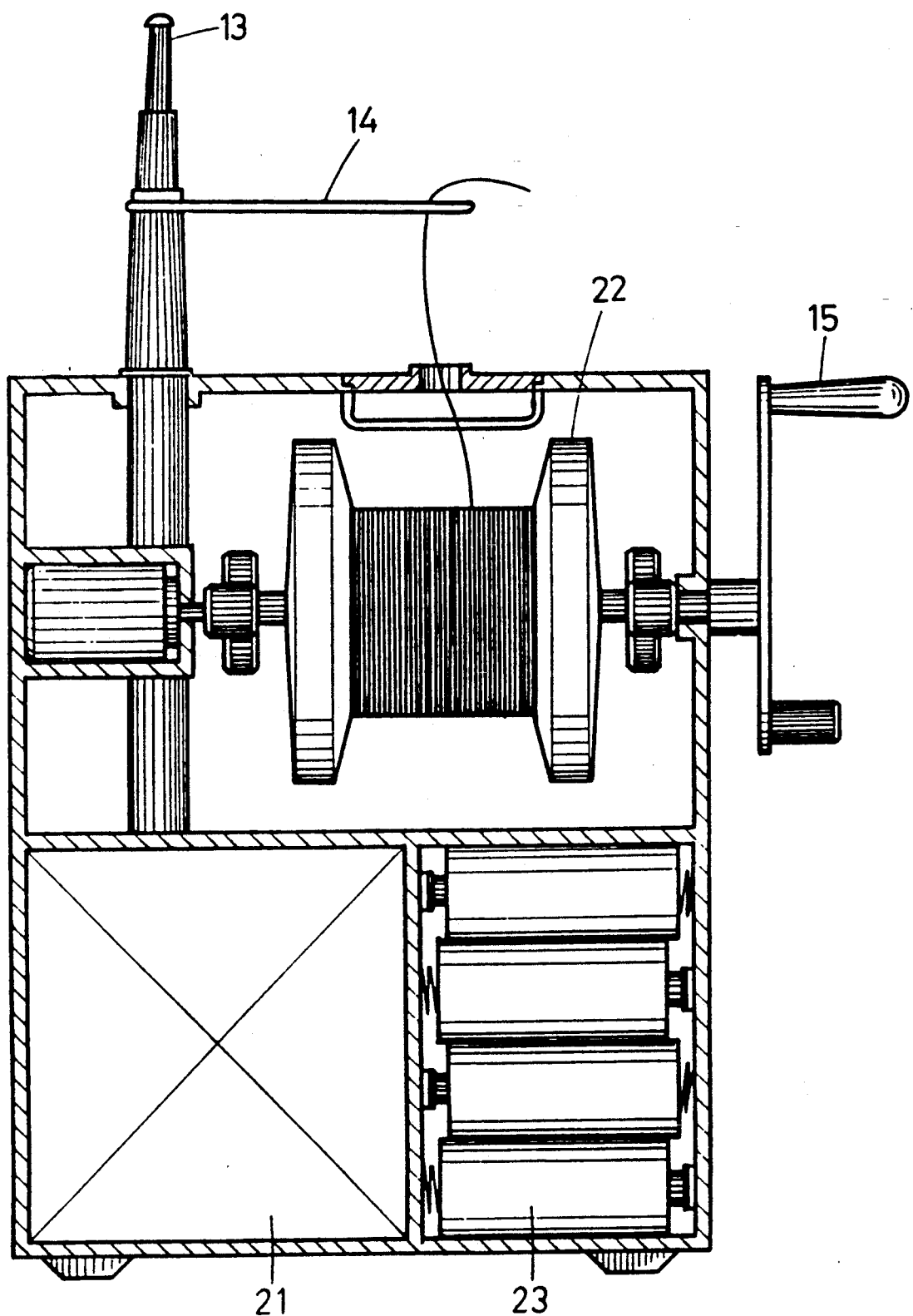
FIG. 2 is a vertical cross-sectional view of the main controller of FIG. 1.
Figure 3:
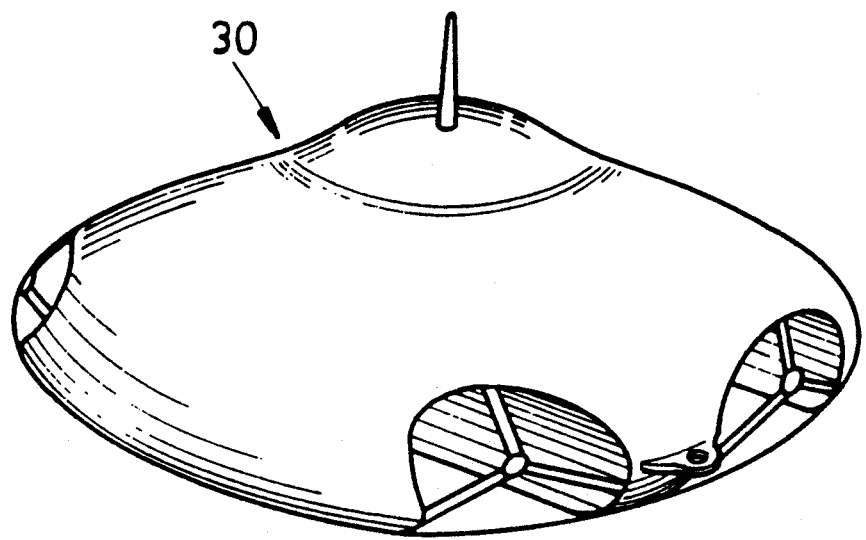
FIG. 3 is a perspective view of the controlled unit of the present invention.
Figure 4:
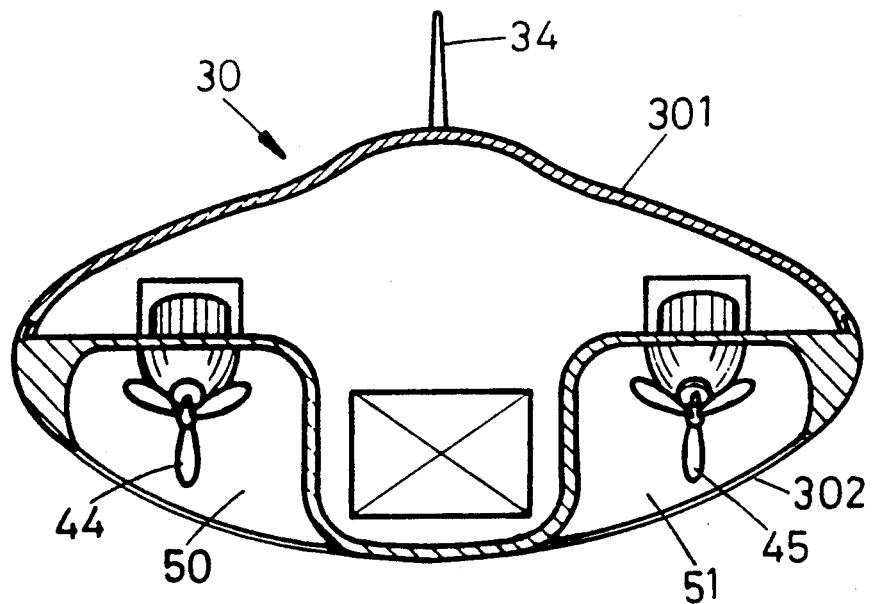
FIG. 4 is a vertical cross-sectional view of the controlled unit of the present invention.
Figure 7:
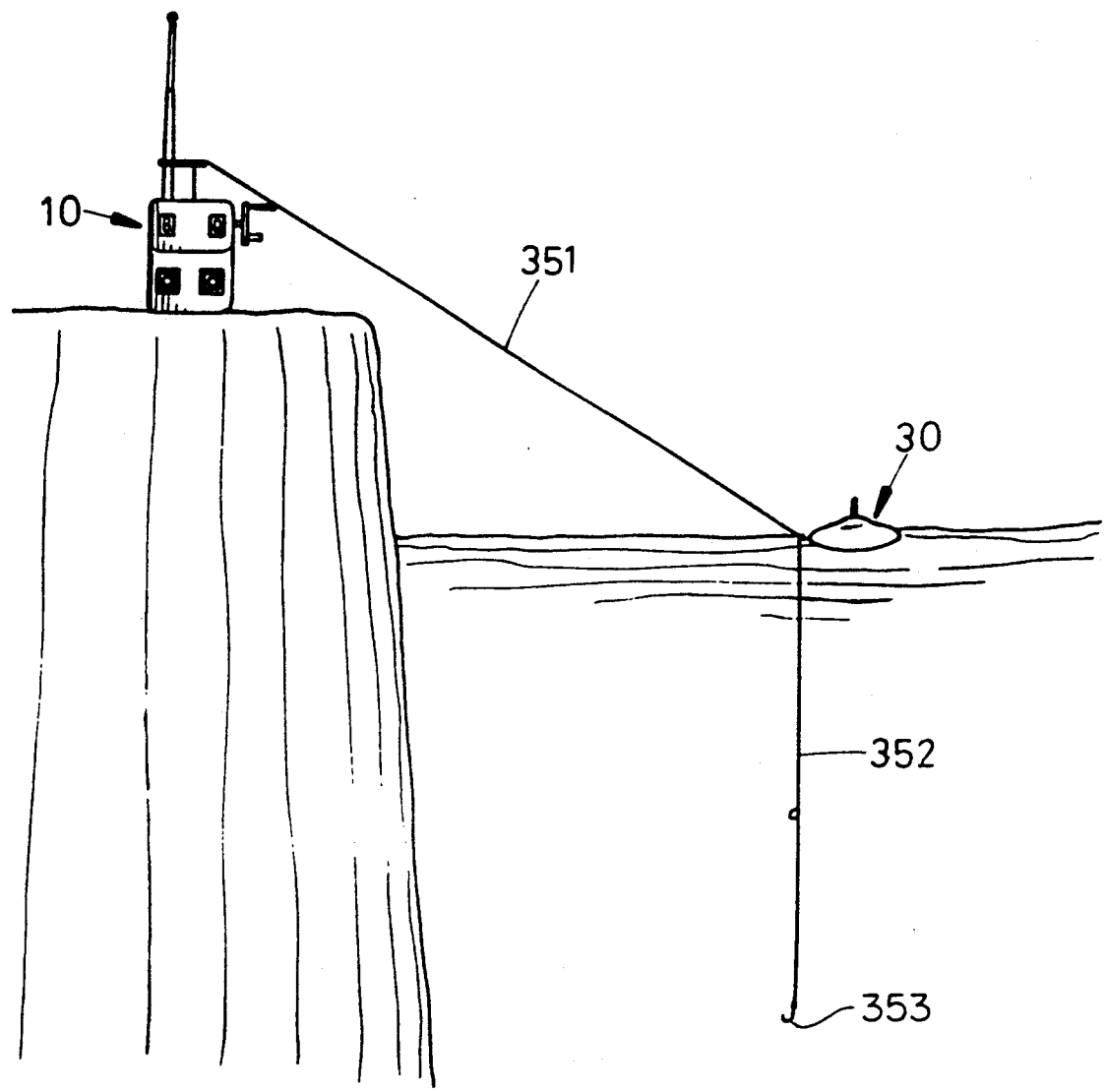
FIG. 7 is a schematic view of how to use the apparatus of the present invention.
Figure 8:
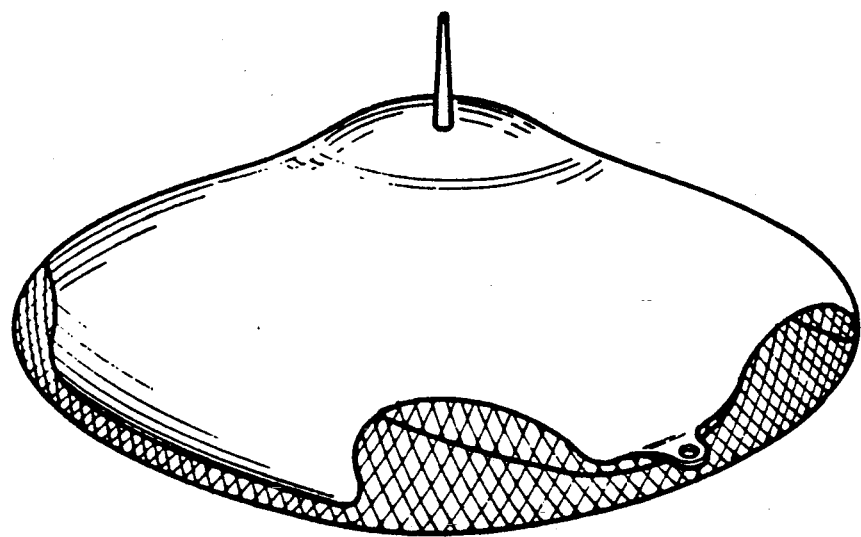
FIG. 8 is a perspective view of another form of the controlled unit of the present invention.
Figure 9:
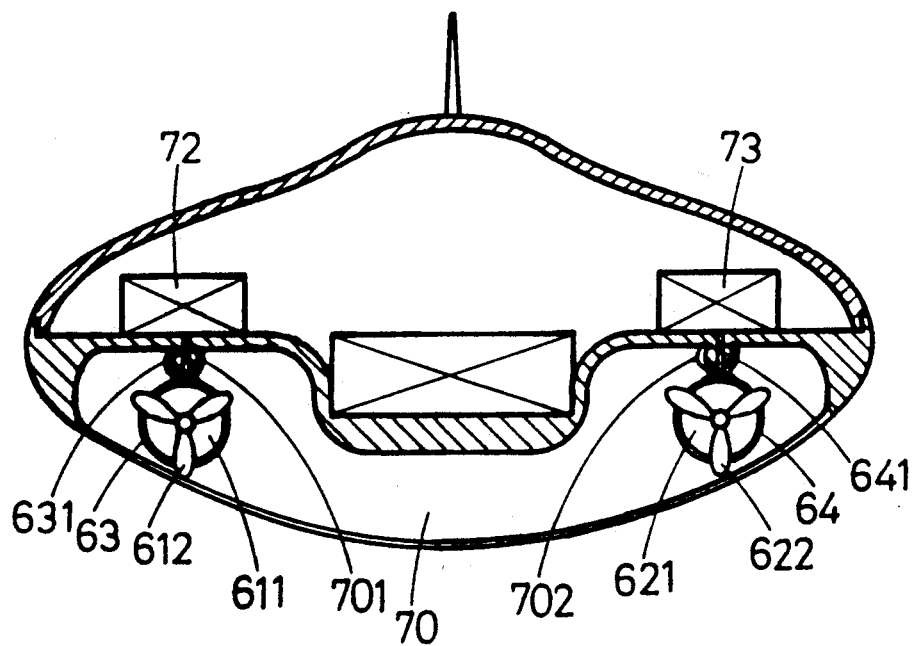
FIG. 9 is a vertical cross-sectional view of the controlled unit of FIG. 8.
Figure 10:
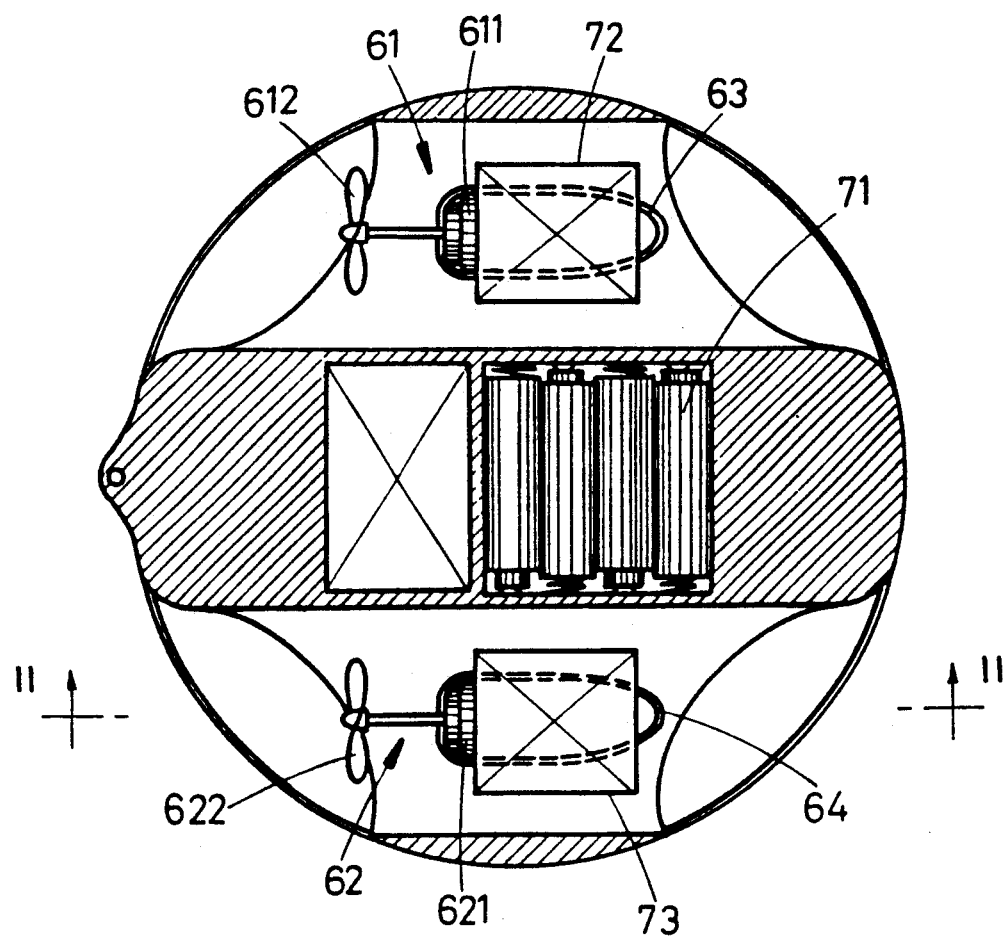
FIG. 10 is a horizontal cross-sectional view of the controlled unit of FIG. 8.
Figure 11:
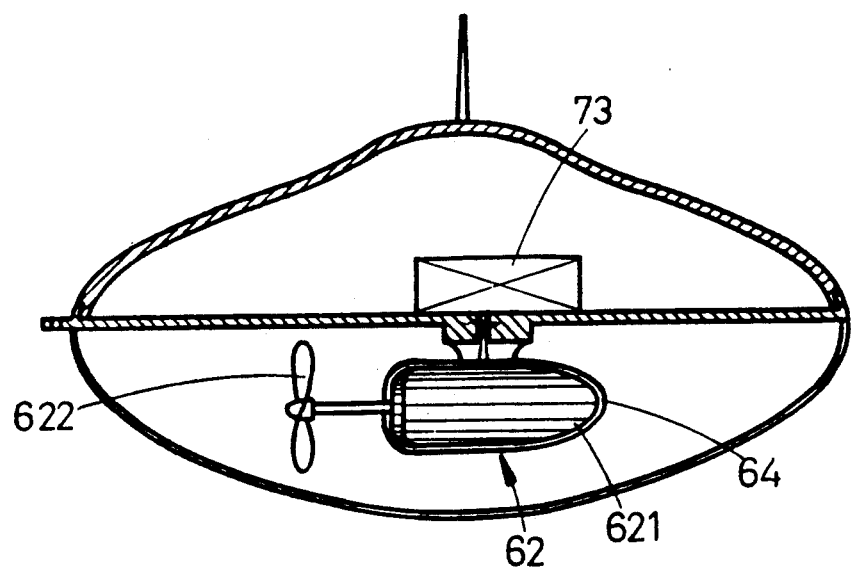
FIG. 11 is a cross-sectional view of the controlled unit taken along line 11 of FIG. 8.

Each of the two throttle sticks 11, 12 of the main controller 10 is a three-level control stick: the upper section is forward movement, the central position is neutral, and the lower section is reverse movement (as shown in FIG. 1, 2 and 7). The transmitting antenna 13 of radio wave transmitter 21 is on the top of the main controller 10 and attached with a fishing line ring 14 which supports the fishing line, and the two throttle sticks 11, 12 on the radio wave transmitter 21 transmit bifrequency signals to the controlled unit 30 via the transmitting antenna 13.

The reel-handle 15, powered reeling switch 16 and clutch stick 17 outside the main controller 10 are connected to the reeling device 22 inside the main controller 10, and the manual or powered reeling operation may be selected according to the practical requirement (as shown in FIG. 1 and 2).

The controlled unit 30 is connected to the main controller 10 through a primary fishing line 351 and consists of an upper housing 301, a lower housing 302, a radio wave receiver 31, two electronic speed controllers 32, 33, a receiving antenna 34, a fishing line holder 35, two spiral propeller units 40, 41, two driving water channels 50, 51, and a battery set 60.

The receiving antenna 34 at the top of controlled unit 30 receives and transmits the bifrequency signals to the radio wave receiver 31 which receives and transmits the bifrequency signals to the electronic speed controllers 32,33 which changes the volume or direction of current so as to control the direction of revolution of motors 42, 43 of the two spiral propeller units 40, 41.

In the first embodiment, the two spiral propeller units 40, 41 consist of motors 42, 43 and propellers 44, 45, respectively, where the motors 42, 43 are mounted on the controlled unit 30, and the propellers 44, 45 connected to motors 42, 43 by shafts 502, 512, respectively, are located respectively inside the two driving water channels 50, 51 in order to generate dual propelling power to make the controlled unit 30 move.

Filter meshes 53, 54, 55, 56 are provided to the front and rear of two driving water channels 50, 51 respectively in order to prevent aquatic plants or external objects in the water from entering into the two driving water channels 50, 51 to disturb the normal rotation of propellers 44, 45.

Figure 5:
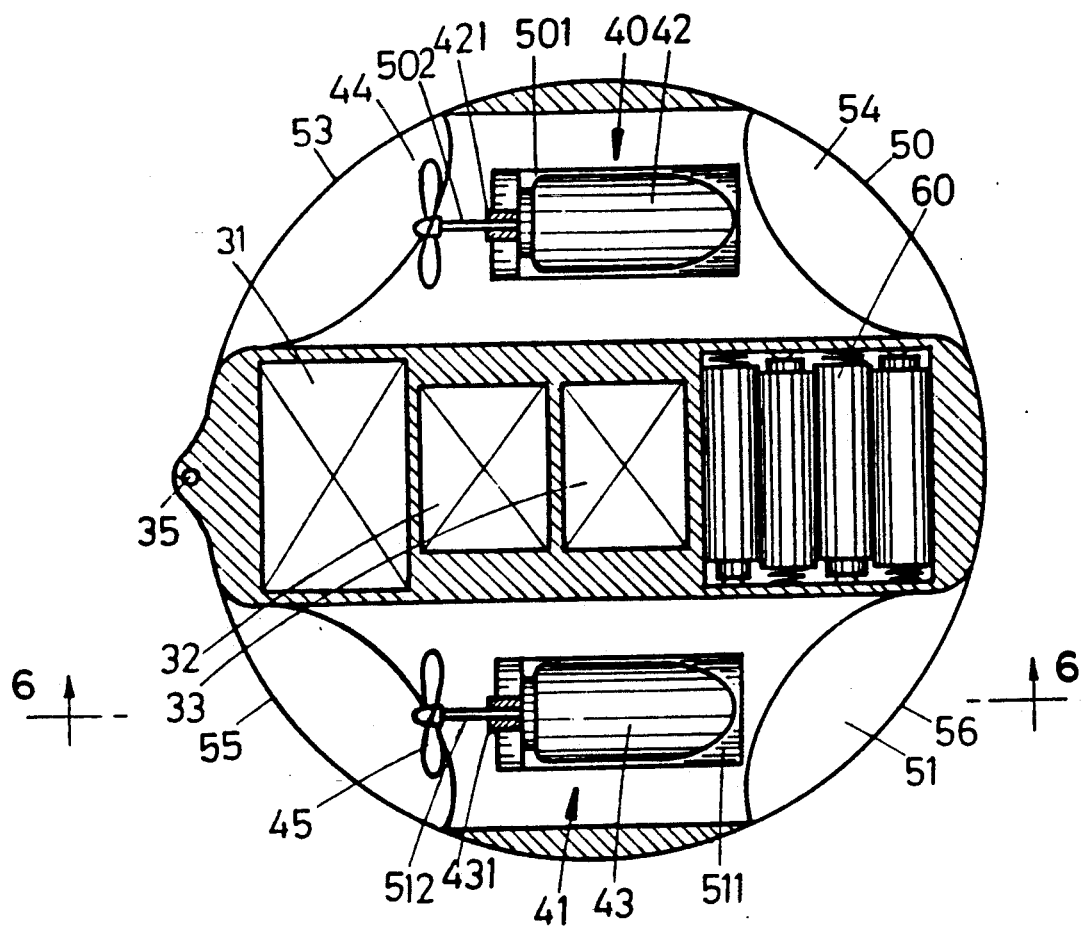
FIG. 5 is a horizontal cross-sectional view of the controlled of Figure unit.
Figure 6:
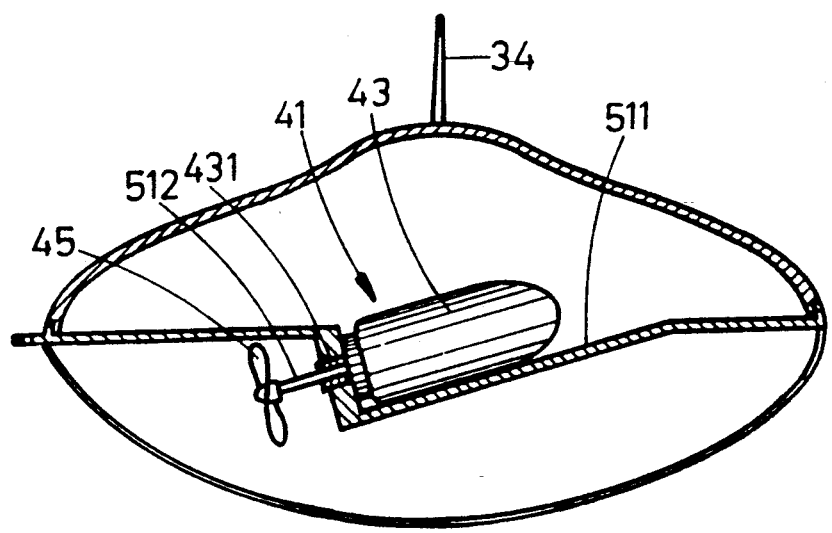
FIG. 6 is a cross-sectional view of the controlled unit taken along line 6—6 of FIG. 5.

A fishing line holder 35 is provided to the rear end of controlled unit 30 and is connected to main controller 10 by primary fishing line 351. A secondary fishing line 352 with a fish hook 353 (as shown in FIGS. 5 and 7) is fastened to it.

When fishing, the user holds the controlled unit 30 vertically, and through the signals of forward or reverse generated by the two throttle sticks 11,12, the radio wave transmitter 21 transmits bifrequency signals to the radio wave receiver 31 of the controlled unit 30 and then to the two electronic speed controllers 32, 33 so as to control the operation of the two spiral propeller units 40, 41, such as the direction of rotation of propellers 44, 45, and to drive the controlled unit 30 to the wanted water area. When a fish is hooked, the reel-handle 15 or powered reeling switch 16 of main controller 10 is operated to retrieve the controlled unit 30 and the prey manually or automatically.

The present invention can be further described in detail with reference to the accompanying FIGS. 8 to 11 in accordance with a second embodiment.

In a second embodiment of remote control fishing tackle according to the present invention, a driving water channel 70 is provided in the solid controlled unit, two spiral propeller units 61, 62 are horizontally disposed paralell to each other on the left and right sides of the driving water channel 70, motors 611, 621 for the two spiral propellers 61, 62 are well covered respectively with waterproof casings 63, 64, and propellers 612, 622 on the driving shafts of motors 611, 621 are directly disposed in the water of driving water channel 70. Other structure of the second embodiment is the same as that of the first embodiment. In addition, in the second embodiment, the two driving water channels 50, 51 of the first embodiment are replaced by only one driving water channel 70, and the two spiral propellers or any other propelling device or similar functional mechanism also can be applied in the driving water channel 70 in different ways.

The radio remote control electrical circuits for the main controller and controlled unit of the remote control fishing tackle employed in the present invention are existing products of radio circuit transmitting and receiving systems that are in general use so that it is not necessary to describe these components in detail.

Since the main controller is the combination of fishing rod, reel and transmitter, the present invention can be separated as a fishing rod, a reeling device, a transmitter and a fishing hook and bait (lure) carrier that is the same as the controlled unit. Therefore, a controlled unit can be applied to the conventional fishing rod by attaching it with a reel by a fishing line extended from the reel on the fishing rod. The user controls the transmitter and drives the fish hook carrier, i.e. controlled unit, to the ideal spot for fishing.

The above examples are some of the applicable embodiments of the present invention. Any other transformed shape or modified congifuration with similar structure or function should be recognized as being within the scope of the present invention as well.

I claim:

1. Remote control fishing tackle comprising:
  a main controller comprising a first electric power means, a radio transmitter connected to said first electric power means, transmitter control means for controlling said radio transmitter, reel means, and a primary fishing line having at least a portion wound on said reel means and an outer end remote therefrom, said reel means being operable for unreeling and reeling in said primary fishing line;
  a float unit comprising a second electric power source, a radio receiver connected to said second electric power source and tuned to said radio transmitter for receiving signals from said radio transmitter, drive control means operable by said radio receiver and connected to said second electric power source, two drive propeller means operatively connected to said drive control means for being driven thereby for driving said float unit, attachment means for attaching said outer end of said primary fishing line to said float unit, a secondary fishing line connected to said float unit and a fish hook connected to said secondary fishing line, so that said float unit is controlled by said radio signals from said radio transmitter for driving said float unit by said drive control means to a desired fishing location remote from said main controller with unreeling of said primary fishing line from said reel means and reeling in of said float unit by said reel means after fishing;
  wherein,
  said two drive propeller means comprise first and second drive propellers mounted on said float unit in spaced relationship relative to each other;
  said drive control means comprises first and second controllers for said first and second drive propeller means, respectively;
  said radio transmitter and said radio receiver are a bifrequency transmitter and a bifrequency receiver; and
  said transmitter control means comprises first and second control rods for controlling said radio transmitter to transmit radio signals to said radio receiver for operating said first and second drive propeller means, respectively, to drive said float unit at controlled speeds and in forward, reverse, and turning directions.

2. The remote control fishing tackle as claimed in claim 1 wherein said reel means comprises:
  a reel;
  a manual operating device for operating said reel; and
  a power operating device connected to said first electric power source for operating said reel, so that said reel is operable selectively by one of said manual and power operating devices.

3. Remote control fishing tackle comprising:
  a main controller comprising a first electric power means, a bifrequency radio transmitter connected to said first electric power means, transmitter control means for controlling said radio transmitter, reel means, and a primary fishing line having at least a portion wound on said reel means and an outer end remote therefrom, said reel means being operable for unreeling and reeling in said primary fishing line;
  a float unit comprising a base section, two separate water channels in said base section, second electric power source, a bifrequency radio receiver connected to said second electric power source and tuned to said radio transmitter for receiving signals from said radio transmitter, drive control means operable by said radio receiver and connected to said second electric power source, a drive propeller means in each of said water channels operatively connected to said drive control means for being driven thereby for driving said float unit, attachment means for attaching said outer end of said primary fishing line to said float unit, a secondary fishing line connected to said float unit and a fish hook connected to said secondary fishing line, so that said float unit is controlled by said ratio signals from said radio transmitter for driving said float unit by said drive control means to a desired fishing location remote from said main controller with unreeling of said primary fishing line from said reel means and reeling in of said float unit by said reel means after fishing;
  said drive propeller means comprising first and second drive propellers mounted on said float unit in spaced relationship relative to each other;
  said drive control means comprising first and second controllers for said first and second drive propeller means, respectively; and
  said transmitter control means comprising first and second control rods for controlling said radio transmitter to transmit radio signals to said radio receiver for operating said first and second drive propeller means, respectively, to drive said float unit at controlled speeds and in forward, reverse, and turning directions.

4. The remote control fishing tackle as claimed in claim 3 wherein said reel means comprises:
  a reel;
  a manual operating device for operating said reel; and
  a power operating device connected to said first electric power source for operating said reel, so that said reel is operable selectively by one of said manual and power operating devices.

5. Remote control fishing tackle comprising:
  a main controller comprising a first electric power means, a bifrequency radio transmitter connected to said first electric power means, transmitter control means for controlling said radio transmitter, reel means, and a primary fishing line having at least a portion wound on said reel means and an outer end remote therefrom, said reel means being operable for unreeling and reeling in said primary fishing line;
  a float unit comprising a base section, a common water channel in said base section, a second electric power source, a bifrequency radio receiver connected to said second electric power source and tuned to said radio transmitter for receiving signals from said radio transmitter, drive control means operable by said radio receiver and connected to said second electric power source, two drive propeller means operatively connected to said drive control means for being driven thereby for driving said float unit, attachment means for attaching said outer end of said primary fishing line to said float unit, a secondary fishing line connected to said float unit and a fish hook connected to said secondary fishing line, so that said float unit is controlled by said radio signals from said radio transmitter for driving said float unit by said drive control means to a desired fishing location remote from said main controller with unreeling of said primary fishing line from said reel means and reeling in of said float unit by said reel means after fishing;

said drive propeller means comprising first and second drive propellers mounted in said common water channel in spaced relationship relative to each other;

said drive control means comprising first and second controllers for said first and second drive propeller means, respectively; and said transmitter control means comprising first and second control rods for controlling said radio transmitter to transmit radio signals to said radio receiver for operating said first and second drive propeller means, respectively, to drive said float unit at controlled speeds and in forward, reverse, and turning directions.

6. The remote control fishing tackle as claimed in claim 5 and further comprising:

an inlet and an outlet on said base section for said common water channel; and a protective mesh mounted on said base section of said float unit covering at least said inlet and outlet of said common water channel.

7. The remote control fishing tackle as claimed in claim 6 wherein said reel means comprises:

a reel;

a manual operating device for operating said reel; and a power operating device connected to said first electric power source for operating said reel, so that said reel is operable selectively by one of said manual and power operating devices.

8. The remote control fishing tackle as claimed in claim 5 wherein said reel means comprises:

a reel;

a manual operating device for operating said reel; and a power operating device connected to said first electric power source for operating said reel, so that said reel is operable selectively by one of said manual and power operating devices.

* * * * *